US012786447B2

(12) United States Patent
Meardi

(10) Patent No.: US 12,786,447 B2
(45) Date of Patent: Nov. 3, 2026

(54) FLEXIBLE ENCODING OF COMPONENTS IN TIERED HIERARCHICAL CODING

(71) Applicant: V-NOVA INTERNATIONAL LIMITED, London (GB)

(72) Inventor: Guido Meardi, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 1104 days.

(21) Appl. No.: 17/769,591

(22) PCT Filed: Oct. 16, 2020

(86) PCT No.: PCT/GB2020/052616
§ 371 (c)(1),
(2) Date: Apr. 15, 2022

(87) PCT Pub. No.: WO2021/074644
PCT Pub. Date: Apr. 22, 2021

(65) Prior Publication Data
US 2024/0129500 A1 Apr. 18, 2024

Related U.S. Application Data

(60) Provisional application No. 62/923,380, filed on Oct. 18, 2019.

(51) Int. Cl.
*H04N 19/33* (2014.01)
*H04N 19/156* (2014.01)
(Continued)

(52) U.S. Cl.
CPC ........... *H04N 19/33* (2014.11); *H04N 19/156* (2014.11); *H04N 19/186* (2014.11); *H04N 19/187* (2014.11)

(58) Field of Classification Search
CPC .... H04N 19/33; H04N 19/156; H04N 19/186; H04N 19/187; H04N 19/30; H04N 19/70
See application file for complete search history.

(56) References Cited

U.S. PATENT DOCUMENTS

2013/0329777 A1* 12/2013 Konda ................ H04N 19/164 725/116
2016/0007032 A1* 1/2016 Alshina ............... H04N 19/176 375/240.02

(Continued)

FOREIGN PATENT DOCUMENTS

CN 105432083 A 3/2016
CN 108401157 A 8/2018

OTHER PUBLICATIONS

International Search Report and Written Opinion for PCT/GB2020/052616 mailed Dec. 23, 2020.

(Continued)

*Primary Examiner* — Tracy Y. Li
(74) *Attorney, Agent, or Firm* — Workman Nydegger

(57) ABSTRACT

Examples described herein relate to signal coding. Systems and methods of encoding and decoding a signal, such as a video signal, are described. In one case, a method of encoding a signal uses a hierarchical coding approach, wherein the signal is encoded at a first layer using a first encoding module and at a second layer using a second encoding module. The signal is composed of two or more components. The method includes steps of sending a signal from the second encoding module to the first encoding module to instruct the first encoding module to provide to the second encoding module only a first component of the signal at the first layer.

19 Claims, 2 Drawing Sheets

(51) Int. Cl.
*H04N 19/186* (2014.01)
*H04N 19/187* (2014.01)

(56) References Cited

U.S. PATENT DOCUMENTS

| | | | | |
|---|---|---|---|---|
| 2016/0014413 | A1* | 1/2016 | Sato | H04N 19/46 375/240.12 |
| 2016/0150238 | A1* | 5/2016 | Park | H04N 19/59 375/240.08 |
| 2016/0227248 | A1* | 8/2016 | Choi | H04N 19/70 |
| 2016/0316215 | A1 | 10/2016 | Minoo et al. | |
| 2017/0201766 | A1* | 7/2017 | Choi | H04N 19/597 |
| 2018/0295400 | A1 | 10/2018 | Thomas et al. | |
| 2019/0116360 | A1 | 4/2019 | Hinz et al. | |

OTHER PUBLICATIONS

Heindel Andreas et al: "Low-Complexity Enhancement Layer Compression for Scalable Lossless Video Coding Based on HEVC", IEEE Transactions on Circuits and Systems for Video Technology, Institute of Electrical and Electronics Engineers, US, vol. 27, No. 8, Aug. 1, 2017 (Aug. 1, 2017), pp. 1749-1760, XP011658058, ISSN: 1051-8215, DOI: 10.1109/TCSVT.2016.2556338. [retrieved on Aug. 3, 2017].

"Test Model 2 of Low Complexity Enhancement Video Coding", 127 MPEG Meeting; Jul. 8, 2019-Jul. 12, 2019; Gothenburg; (Motion Picture Expert Group or ISO/IEC JTC1/SC29/WG11), No. n18572, Aug. 10, 2019 (Aug. 10, 2019), XP030206784, retrieved from the Internet:http:/phenix.int-evry.fr/mpeg/doc_end_user/documents/127_Gothenburg/wg11/w18572.zip N18572—Test Model for Low Complexity Video Coding Enhancement—v.1.docx [retrieved on Aug. 10, 2019].

Office Action received for Chinese Patent Application No. 202080086895.9, mailed on Mar. 28, 2025, 14 pages (6 pages of English Translation and 8 pages of Original Document).

* cited by examiner

FLEXIBLE ENCODING OF COMPONENTS IN TIERED HIERARCHICAL CODING

CROSS-REFERENCE TO RELATED APPLICATIONS

The present application is a 371 US Nationalization of International Patent Application No. PCT/GB2020/052616, filed Oct. 16, 2020, which claims priority to U.S. Patent Application No. 62/923,380, filed Oct. 18, 2019. The entire disclosures of the aforementioned applications are incorporated herein by reference.

TECHNICAL FIELD

The present invention relates to methods for processing signals, such as by way of non-limiting examples video, image, hyperspectral image, audio, point clouds, 3DoF/6DoF and volumetric signals. Processing data may include, but is not limited to, obtaining, deriving, encoding, outputting, receiving and reconstructing a signal in the context of a hierarchical (tier-based) coding format, where the signal is decoded in tiers at subsequently higher level of quality, leveraging and combining subsequent tiers ("echelons") of reconstruction data. Different tiers of the signal may be coded with different coding formats, (e.g., by way of non-limiting examples, traditional single-layer DCT-based codecs, ISO/IEC MPEG-5 Part 2 Low Complexity Enhancement Video Coding SMPTE VC-6 2117, etc.), by means of different elementary streams that may or may not multiplexed in a single bitstream.

BACKGROUND

In tier-based coding formats, such as ISO/IEC MPEG-5 Part 2 LCEVC (hereafter "LCEVC"), or SMPTE VC-6 2117 (hereafter "VC-6"), a signal is decomposed in multiple "echelons" (also known as "hierarchical tiers") of data, each corresponding to a "Level of Quality" (also referred to herein as "LoQ") of the signal, from the highest echelon at the sampling rate of the original signal to a lowest echelon, which typically has a lower sampling rate than the original signal. In the non-limiting example when the signal is a picture in a video stream, the lowest echelon may be a thumbnail of the original picture, e.g. a low-resolution frame in video stream, or even just a single picture element. Other echelons contain information on correction to apply to a reconstructed rendition in order to produce the final output. Echelons may be based on residual information, e.g. a difference between a version of the original signal at a particular level of quality and a reconstructed version of the signal at the same level of quality. A lowest echelon may not comprise residual information but may comprise the lowest sampling of the original signal. The decoded signal at a given Level of Quality is reconstructed by first decoding the lowest echelon (thus reconstructing the signal at the first—lowest—Level of Quality), then predicting a rendition of the signal at the second—next higher—Level of Quality, then decoding the corresponding second echelon of reconstruction data (also known as "residual data" at the second Level of Quality), then combining the prediction with the reconstruction data so as to reconstruct the rendition of the signal at the second—higher—Level of Quality, and so on, up to reconstructing the given Level of Quality.

Reconstructing the signal may comprise decoding residual data and using this to correct a version at a particular Level of Quality that is derived from a version of the signal from a lower Level of Quality. Different echelons of data may be coded using different coding formats, and different Levels of Quality may have different sampling rates (e.g., resolutions, for the case of image or video signals). Subsequent echelons may refer to a same signal resolution (i.e., sampling rate) of the signal, or to a progressively higher signal resolution. Examples of these approaches are described in more detail in the available specifications for LCEVC and VC-6.

The process of encoding and decoding a signal tends to be resource intensive. For example, video encoding and decoding requires a frame of data to be processed in fractions of a second (33 ms for frames at 30 Hz or 16 ms for frames at 60 Hz). Applications such as videoconferencing, which require both audio and video encoding and transmission over a network, often command a large proportion of available resources on a computing device. Additional challenges are also faced with mobile devices, that operate with more limited processing resources and typically use battery power. It is desired to provide improved encoding and decoding methods for variable real-world use conditions.

SUMMARY

Aspects of the present invention are set out in the appended independent claims. Variations of the present invention are set out in the appended dependent claims. Additional variations and aspects are set out in the examples described herein.

DETAILED DESCRIPTION

Figure 1:
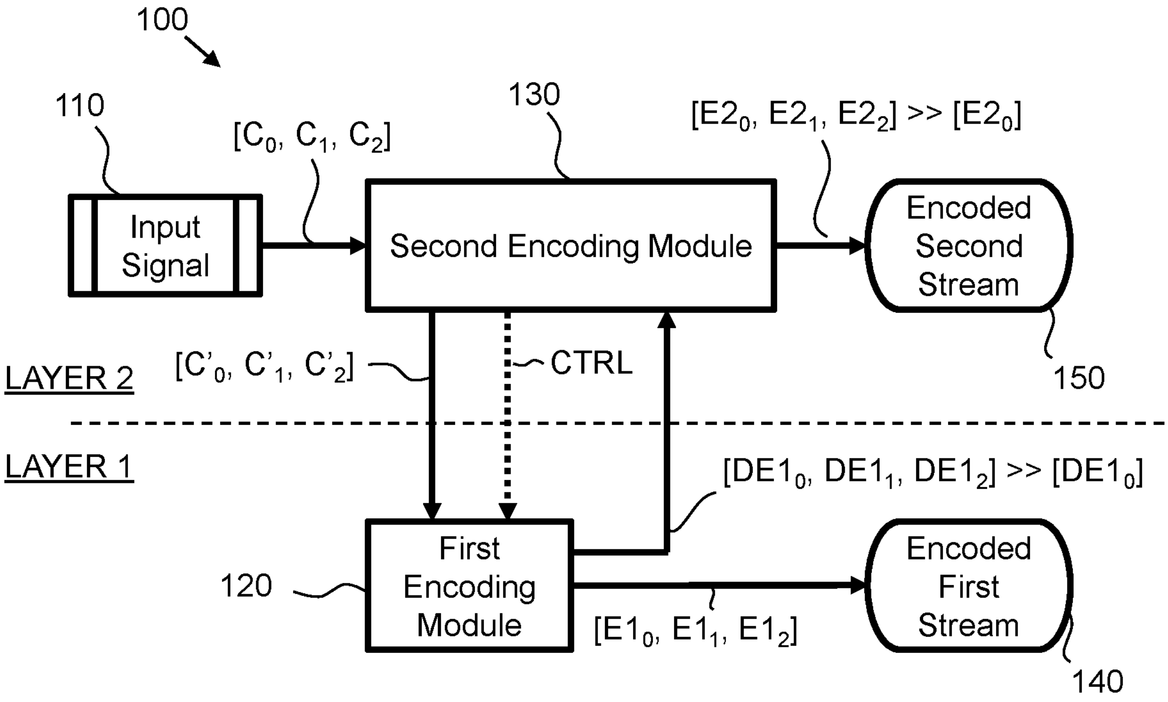
FIG. 1 shows a block diagram of an example of an encoding system in accordance with embodiments.

In tier-based hierarchical coding technologies, such as those embodied in LCEVC and VC-6, a signal may require a varying amount of correction based on the fidelity of the predicted rendition of a given Level of Quality (LoQ). This correction is provided by "residual data" (or simply "residuals") in order to generate a reconstruction of the signal at the given LoQ that best resembles (or even losslessly reconstructs) the original signal. In tier-based hierarchical coding, a signal may consist of multiple components or channels. For an audio signal, these may comprise components relating to different loudspeakers and/or microphones. For a video signal, these may comprise components relating to different colour channels. For example, LCEVC and VC-6 are configured to process different chroma planes (e.g., by way of non-limiting example, Y or luma, U chroma and V chroma). Chroma planes may be defined according to a specified colour encoding method and may be reconstructed to their target resolution by means of independent residual planes. Chroma planes may be processed in series or in parallel and may be combined in an output reconstruction for rendering on a display device. Further details of standardised processes for decoding chroma planes are described in the specifications for LCEVC and VC-6.

Encoding and/or decoding a signal requires efficient use of available resources. For example, hardware and/or software encoders and decoders need to efficiently control processor, memory and power utilization (amongst others). For mobile encoders and decoders, such as smartphones and tablets, power is typically provided by a battery. When battery consumption is relevant, e.g. when it needs to be conserved, encoding processing power is a relevant metric to minimize. In several devices (such as, by way of non-limiting example, mobile devices), power consumption is significantly influenced by the amount of memory accesses and memory copies.

Certain novel embodiments illustrated herein allow encoding and/or decoding devices to flexibly save significant processing power by means of limiting the encoding of upper layer signals to a subset of available signal components. Surprisingly, only encoding one component of a signal at a higher level can still provide perceivable improvements in an output reconstruction, yet significantly reduce resource utilization. This makes it a suitable adaptation to known tier-based hierarchical coding approaches for efficient encoding and decoding when resources, e.g. on a computing device, is limited. In one example, restricting the encoding of components of the signal limits the generation of echelons of residuals for chroma planes for higher levels of quality.

Non-limiting embodiments illustrated herein refer to a signal as a sequence of samples. These sample may comprise, for example, two-dimensional images, video frames, video fields, sound frames, etc. In the description the terms "image", "picture" or "plane" (intended with the broadest meaning of "hyperplane", i.e., array of elements with any number of dimensions and a given sampling grid) will be often used to identify the digital rendition of a sample of the signal along the sequence of samples, wherein each plane has a given resolution for each of its dimensions (e.g., X and Y), and comprises a set of plane elements (or "element", or "pel", or display element for two-dimensional images often called "pixel", for volumetric images often called "voxel", etc.) characterized by one or more "values" or "settings" (e.g., by ways of non-limiting examples, colour settings in a suitable colour space, settings indicating density levels, settings indicating temperature levels, settings indicating audio pitch, settings indicating amplitude, settings indicating depth, settings indicating alpha channel transparency level, etc.). Each plane element is identified by a suitable set of coordinates, indicating the integer positions of said element in the sampling grid of the image. Signal dimensions can include only spatial dimensions (e.g., in the case of an image) or also a time dimension (e.g., in the case of a signal evolving over time, such as a video signal).

As non-limiting examples, a signal can be an image, an audio signal, a multi-channel audio signal, a telemetry signal, a video signal, a 3DoF/6DoF video signal, a volumetric signal (e.g., medical imaging, scientific imaging, holographic imaging, etc.), a volumetric video signal, or even signals with more than four dimensions.

For simplicity, non-limiting embodiments illustrated herein often refer to signals that are displayed as 2D planes of settings (e.g., 2D images in a suitable colour space), such as for instance a video signal. The terms "picture, "frame" or "field" will be used interchangeably with the term "image", so as to indicate a sample in time of the video signal: any concepts and methods illustrated for video signals made of frames (progressive video signals) can be easily applicable also to video signals made of fields (interlaced video signals), and vice versa. Despite the focus of embodiments illustrated herein on image and video signals, people skilled in the art can easily understand that the same concepts and methods are also applicable to any other types of multidimensional signal (e.g., audio signals, volumetric signals, stereoscopic video signals, 3DoF/6DoF video signals, plenoptic signals, point clouds, etc.).

Components of a signal represent different "values" or "settings". For example, these may comprise, as set out above, different colour channels, different sensor channels, different audio channels, metadata channels etc. For example, a different plane of samples as set above may be provided for each of the different components, and an encoding and/or decoding process may be applied to each component plane in series or in parallel to generate encoded and decoded versions of the components. For ease of explanation, reference will be made herein to a YUV colour encoding of a video signal, where there are three components—Y, U and V. Y represents a luma or brightness channel and U and V represent different opponent colour channels. It should be noted that the described examples are not limited to YUV encodings and may be applied to different colour encodings (including RGB, Lab, YDbDr, XYZ etc.) and to non-colour examples. For example, for surround sound audio, there may be 6 audio channels including front left and right, surround left and right, centre and sub-woofer channels.

In a first aspect described herein, there is a method of encoding a signal using a hierarchical or multi-layer coding approach. The signal is encoded at a first layer using a first encoding module and at a second layer using a second encoding module. For example, the first encoding module may represent a base encoding layer and the second layer may represent an enhancement encoding layer. Alternatively, the first and second encoding modules may represent different sub-layers of an enhancement encoding layer. The signal is composed of two or more components.

In examples of the first aspect, the components encoded by the second encoding module comprise a subset of the components encoded by the first encoding module. This may be implemented by the method comprising sending a signal from the second encoding module to the first encoding module to instruct the first encoding module to provide to the second encoding module only a first component of the signal at the first layer. The signal may be sent when the second module determines that only the first component of the signal is to be encoded at the second layer. As the second encoding module only receives a subset of the components from the first encoding module, it may only encode what it receives. This not only reduces the memory use by the first and second encoding modules, it also reduces the computations performed by the second encoding module.

FIG. 1 shows an example encoding device 100 configured to encode an input signal 110 using a hierarchical coding approach. In preferred examples, the encoders or decoders are part of a tier-based hierarchical coding scheme or format. The term "tier" refers to the fact that a signal is encoded as a series of layers and the term "hierarchical" refers to the fact that signal information is passed from lower tiers to higher tiers during encoding. In certain cases, signal information relating to an input signal may also be passed from higher tiers to lower tiers, e.g. as part of a sub or down-sampling arrangement. Examples of a tier-based hierarchical coding scheme include LCEVC: MPEG-5 Part 2 LCEVC ("Low Complexity Enhancement Video Coding") and VC-6: SMPTE VC-6 ST-2117, the former being described in PCT/GB2020/050695 (and the associated standard document) and the latter being described in PCT/GB2018/

053552 (and the associated standard document), all of which are incorporated by reference herein. However, the concepts illustrated herein need not be limited to these specific hierarchical coding schemes. The concepts may also be applied to other multi-layer encoding and decoding schemes, e.g. those that use a base layer and an enhancement layer.

The encoding device 110 encodes the input signal 110 using at least a first layer (LAYER 1) using a first encoding module 120 and a second layer (LAYER 2) using a second encoding module 130. The input signal 110 is composed of two or more components, in FIG. 1 three components $C_0$, $C_1$, and $C_2$ are shown as an example, where each component may comprise a plane of data (e.g. a 2D array of values for frames of video or a 1D array of values for audio data). The input signal 110 may thus be considered as three parallel planes within an array—[$C_0$, $C_1$, $C_2$]. The three example components in FIG. 1 may respectively comprise YUV channels for a video signal. The encoding device 110 may be a mobile device, such as a mobile phone, a tablet, a laptop, a low-power portable device (e.g., a smartwatch), etc. The encoding device 110 may comprise a mixture of hardware and software, for example, the first encoding module 120 may comprise a hardware encoder (i.e. with functionality accelerated by one or more dedicated encoding chipsets) and the second encoding module 130 may comprise a software encoder, e.g. implemented by way of a processor and computer program code loaded into accessible memory. In certain examples, the encoding device 110 may comprise a mobile computing device where both the first and second encoding modules are implemented via a processor processing computer program code, or both the first and second encoding modules may comprise dedicated chipsets. Various combinations are possible as is known from the LCEVC standard.

In FIG. 1, the second encoding module 130 receives the input signal 110 and provides a modified version of this signal (components [$C'_0$, $C'_1$, $C'_2$]) to the first encoding module 120. In an LCEVC implementation, the modified version of the input signal 110 may comprise a downsampled or downscaled version of the input signal, such that the first layer (LAYER 1) operates at a lower spatial resolution than the second layer (LAYER 2). The first layer is a lower layer in the tier-based hierarchy and may comprise a lower resolution layer, i.e. as compared to the second layer. The first encoding module 120 receives the modified version of the input signal ([$C'_0$, $C'_1$, $C'_2$]) and generates an encoded first stream 140. The encoded first stream may comprise encoded components ([$E1_0$, $E1_1$, $E1_2$]). Although separate encodings are shown for each component in FIG. 1, in certain examples, the first encoding module 120 may encode all components as a combined encoding.

In FIG. 1, the second encoding module 130 generates an encoded second stream 150. The second encoding module 130 may generate the encoded second stream 150 using the input signal 110 and an output of the first encoding module 120. In the example of FIG. 1, the second encoding module 130 receives a predicted rendition of the signal from the first encoding module 120 in the form of a decoded version of the encoded first stream 150, shown as [$DE1_0$, $DE1_1$, $DE1_2$] in FIG. 1, where there is, in a first operating mode, decoded versions of each encoded component. If the input to the first encoding module 120 in the first layer is at a first spatial resolution (i.e. forming the first layer of quality), the decoded version of the encoded first stream may also be at that same first spatial resolution. In other examples, layers of quality may be defined using different approaches, such as different sampling parameters, different bit depths, etc. Although in the example of FIG. 1, the first encoding module 120 provides the decoded version of the encoded first stream 150, in other examples the second encoding module 130 may receive the encoded first stream 150 and instruct its decoding as part of the second encoding. Either approach may be used such that the second encoding module 130 has access to a reconstruction of the signal from the first layer that may be used within the second encoding. Those skilled in the art that are familiar with the LCEVC standard will understand that the first encoding module 120 may comprise a base codec and the second encoding module 130 may comprise an LCEVC encoder. The second encoding module 130 may operate at a second spatial resolution (forming the second layer of quality) and in certain cases may involve an upsampling from the first spatial resolution to the second spatial resolution.

In certain examples, such as those similar to LCEVC, the first and second encoding modules 120, 130 may respectively implement different coding methods. For example, the first coding method may correspond to a single-layer coding method (such as AVC, HEVC, AV1, VP9, EVC, VVC, VC-6) whilst the second method may correspond to a different multi-layer coding method (such as LCEVC). In other examples, the first and second encoding modules 120, 130 may respectively implement the same coding method (such as VC-6 or AVC/HEVC).

The example of FIG. 1 differs from an implementation of an encoder for the LCEVC or VC-6 standards in that the second encoding module 130 is configured to send a control signal (CTRL) to the first encoding module 120 so as to change from a first operating mode where all components of the signal are encoded to a second operating mode where a subset of the original components of the signal are encoded. The control signal instructs the first encoding module 120 to provide to the second module only a first component of the signal at the first layer. This result is shown by the double arrows (>>) in FIG. 1. Following the CTRL signal to instruct the second operating mode, the first encoding module 120 outputs the first decoded component [$DE1_0$] instead of the full set of decoded components ([$DE1_0$, $DE1_1$, $DE1_2$]). The second encoding module 130 thus only receives the first decoded component and only generates an encoded second stream comprising a second layer encoded version of the first component, i.e. switches from [$E2_0$, $E2_1$, $E2_2$] to [$E2_0$]. For example, this may comprise only outputting one or more sub-layers of an enhancement stream for the first component. In an implementation using the coding approach of LCEVC or similar, the second layer encoded version of the components may comprise encoded residual data for the encoded components, where once decoded, the residual data is combined with a decoded version of the encoded first stream 140 to generate an output reconstruction. In a specific example, this may comprise only receiving and encoding a luma (Y) plane within the second encoding module 130.

Figure 2:
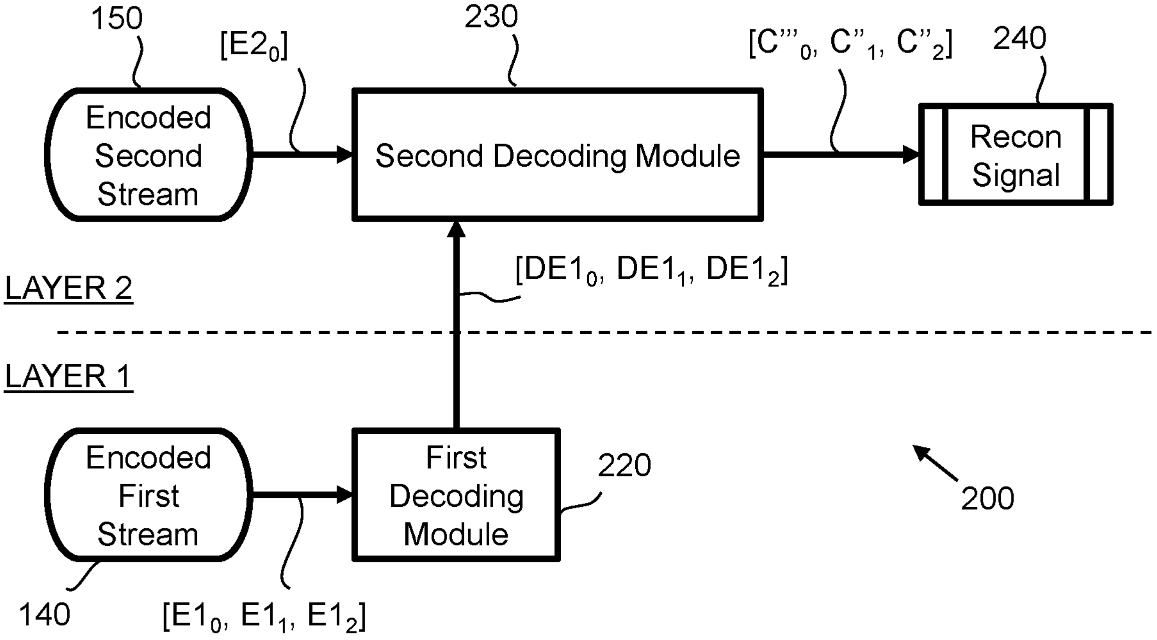
FIG. 2 shows a block diagram of an example of a decoding system in accordance with embodiments.

FIG. 2 shows an example of a second aspect of the present invention. In this case, the second aspect forms a corresponding decoder, wherein the example of FIG. 2 shows a decoding device 200 configured to decode a signal using a hierarchical coding approach that corresponding to the encoding device 100 of FIG. 1. In the decoding device 200 at least two encoded streams are obtained (e.g., received over a network or loaded from a file): an encoded first stream 140 corresponding to the output of the first encoding module 120 in FIG. 1 and an encoded second stream 150 corresponding to the output of the second encoding module 130 in FIG. 1. Hence, a signal received at the decoding device 200 comprises a signal that is encoded within at least a first layer using a first encoding module and within a second layer using a second encoding module. As discussed with reference to FIG. 1, the original input signal 110, whose encoding is received by the decoding device 200 is composed of two or more components. In FIG. 2, the first encoded stream 140 comprises encoded versions of the three components at the first level of quality ([$E1_0$, $E1_1$, $E1_2$]). This is received by a first decoding module 220. The first decoding module 220 may comprise a decoder that corresponds to the first encoding module 120. The first decoding module 220 may comprise a base decoder (e.g., for LCEVC) or a lowest tier (e.g., for VC-6).

In a first operating mode, e.g. according to a standard specification, the encoded second stream 150 also comprises encoded versions of the set of components (i.e., [$E2_0$, $E2_1$, $E2_2$]). The encoded second stream 150 is received by a second decoding module 230, which in the first operating mode may decode the encoded second stream 150 according to a standard specified decoding process (e.g., as specified for an enhancement stream in LCEVC or for an echelon in VC-6).

A second operating mode is shown in FIG. 2. In the second operating mode, the second decoding module 230 receives a subset of the encoded components. For example, in FIG. 2, the second decoding module 230 only receives the $E2_0$ component as is shown being encoded in the second operating mode 130 in FIG. 1. The second decoding module 230 thus decodes only the subset of encoded components. As discussed above, the encoded second stream 150 may comprise a stream of encoded residual data. In the second operating mode, the second decoding module 230 may only decode one (i.e. a subset) set of residual data for one component. In the example of FIG. 2, the second decoding module 230 receives three decoded components from the first decoding module 220 ([$DE1_0$, $DE1_1$, $DE1_2$]) but, in the second operating mode, only uses the single decoded component data stream to output a reconstructed signal 240. The reconstructed signal 240 is a reconstructed version of the input signal 110. It may be output (at least initially) at the same level of quality (e.g., spatial resolution) as the input signal 110. For example, using schemes such as LCEVC or VC-6, this may comprise only adding a plane of decoded residual data for the decoded component and not adding planes of decoded residual data for other components within the full set of components. For example, residual data may only be added to a luma (Y) plane and the other chroma planes may be reconstructed without residual data. In FIG. 2, three reconstructed components are shown—[$C'''_0$, $C''_1$, $C''_2$]— where each reconstructed component may comprise a plane of component data (e.g., colour values and/or sound channel values) at the second level of quality but the plane of component data $C'''_0$ is reconstructed in a different manner to the other planes of component data $C''_1$ and $C''_2$. The plane of component data $C'''_0$ may have undergone a further set of enhancement using the data sent within the encoded second stream 150. As before, the first level of quality of the first layer may relate to a first resolution and the second level of quality of the second layer may relate to a second, higher resolution (in one or more dimensions).

In one case, the decoding device 200 is a passive device and simply decodes and reconstructs based on a set of received encoded streams. For example, if encoded component data is absent from the encoded second stream 150 (e.g., as is shown for components 1 and 2), then this data is not used in the reconstruction. In these cases, the received decoded first level data—$DE1_1$ and $DE1_2$— may be upscaled to a second level of quality without adding any additional residual data; whereas the decoded first level data for the first component—$DE1_0$—may be upscaled and then the decoded second level data—$DE2_0$—may be added to that upscaled first component data.

In another case, even if the second decoding module 230 receives encoded data for all three components in the encoded second stream 150, it may discard data for one or more components based on local processing conditions. For example, if resources are constrained at the decoding device 200, only one component may be decoded and used to output the reconstructed signal 240.

In the examples described herein, one or more of the decoding device and the encoding device may be a mobile device, such as a mobile phone, a tablet, a laptop, a low-power portable device (e.g., a smartwatch), etc. In one case, a device may comprise both encoding and decoding devices, e.g. a mobile phone holding a video-conference may simultaneous encode and decode video streams or a voice assistant may simultaneous encode and decode audio streams.

In certain examples, the control signal (CTRL) described above is sent when the second module determines that only the first component of the signal is to be encoded at the second layer. For example, it may be an optional signal, whereas in the absence of the signal encoding is performed according to a standardised process (such as LCEVC or VC-6). Hence, the examples described herein may comprise an optional "out-of-standard" enhancement that does not affect standardised encoding or decoding; it may be added as an optional feature in certain devices (e.g. mobile or resource-limited devices).

Figure 3:
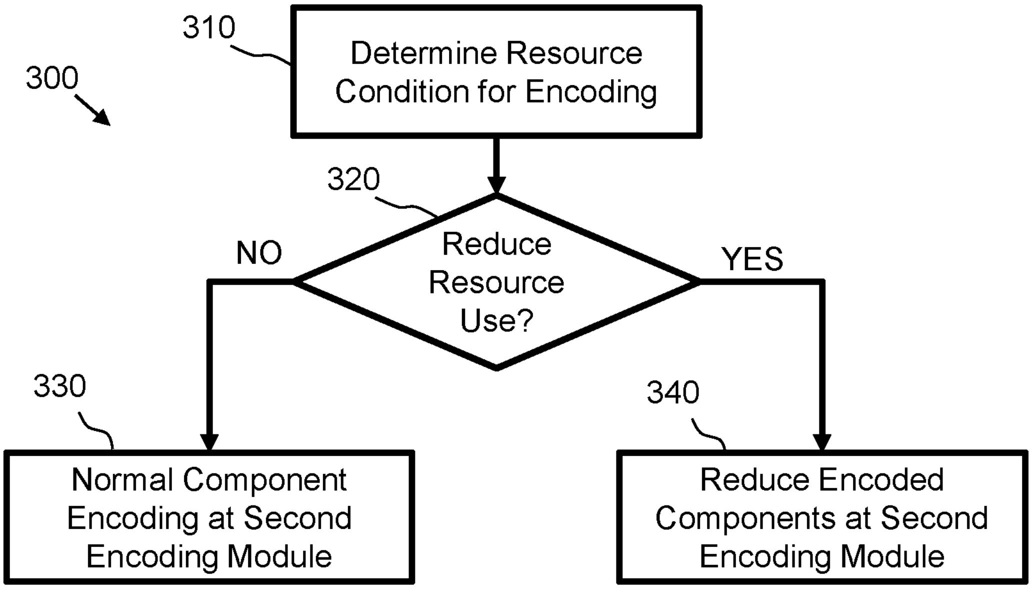
FIG. 3 shows a flow diagram of an example encoding method in accordance with embodiments.

FIG. 3 shows an example method 300 to determine whether a component encoding may be made. At block 310, a resource condition is determined. The resource condition may comprise a need to encode a signal for a low-power service. The low-power service may comprise a videoconferencing service. The resource condition may relate to one or more of: processing capacity, power capacity (e.g., for a battery device), and memory capacity. Processing capacity may relate to one or more of central processing unit (CPU) and graphical processing unit (GPU) capacity. Memory capacity may relate to volatile memory capacity (e.g., random access memory) and/or non-volatile memory capacity (e.g., file storage). Capacity may also relate to a bit capacity for an encoded stream, such as a number of bits available to encode with a target bit rate. Capacity may be measured using resource utilisation (e.g., percentage of clock cycles or memory capacity. that are used).

At block 320, the determined resource condition at block 310 is evaluated to determine if resource use is to be reduced. This may be performed by comparing a measured resource condition with a defined threshold. For example, this may comprise a requirement to reduce power consumption, e.g. based on a battery capacity falling below a threshold value, or to reduce CPU/GPU loading, e.g. based on a threshold utilisation being exceeded. The condition may comprise a requirement to reduce the number of processing operations to be performed in the encoding of the signal. The processing operations may comprise reading and/or writing to memory. For example, these may be mem-copy operations.

Based on the evaluation at block 320, one of blocks 330 or 340 is selected. If resource use does not need to be reduced, e.g. because one or more resource metrics are within acceptable ranges, then at block 330, a full set of components are encoded at a second encoding module, such as 130 in FIG. 1. In this case, no signal may be sent between the second encoding module and a first encoding module, such as 120 in FIG. 1. Alternatively, a control signal may be sent indicating that all components are to be encoded. If resource use does need to be reduced, e.g. because one or more resource metrics are outside of acceptable ranges (or one or more other conditions are met), then at block 340 a determination is made to reduce the components that are encoded at the second encoding module. This may comprise the second encoding module sending a control signal to the first encoding module to reduce the encoded components that are used by the second encoding module. This may comprise omitting a decoding operation at the first encoding module (or another corresponding first decoding module) for an omitted set of components and/or not passing decoded signals for the omitted set of components to the second encoding module. The determination in the method 300 may comprise determining a condition requiring that only a first component of the signal is to be provided. Providing a subset of components of the signal following block 340 may comprise processing, by the first encoding module, multiple components of the signal but only passing, from the first encoding module to the second encoding module, a subset of the components of the signal, such as only the first component of the signal. Providing only the first component of the signal may comprise writing to a memory, by the first encoding module, only the first component of the signal. In yet other examples, providing only the first component of the signal may comprise encoding, by the first module, only the first component of the signal.

Reducing the encoded components may reduce resource use in multiple ways. Processing resources used to encode and/or decode components at one or more of the first and second encoding modules may be saved. Memory use may be reduced by only copying, by the first encoding module, one component from many into memory for access by the second encoding module. The modules described herein may be configured to flexibly encode and/or decode based on a received signal, such that a minimal level of control signalling is required to flexibly change the encoding and decoding approaches (e.g. just the signal from the second encoding module to the first encoding module may be required).

In certain case, the first encoding module may implement a first encoding method, and the second encoding module may implement a second encoding method. The first encoding method may be different from the second encoding method. The first encoding method may alternatively be the same as the second encoding method. The first layer is at a lower level in the hierarchy than the second layer. For example, the first layer may be at a lower resolution than the second layer.

The method of FIG. 3 may be incorporated into a method of encoding a signal using a hierarchical coding approach. In this case, a signal is encoded at a first layer using a first encoding module and at a second layer using a second encoding module, and wherein the signal is composed of two or more components. For example, a configuration similar to that shown in FIG. 1 may be used. The method may comprise receiving a signal at the first module from the second module, the signal instructing the second module to provide only a first component of the signal at the first layer. The signal may be sent when the second module determines that only the first component of the signal is to be encoded at the second layer. The method may further comprise receiving, at the first module, the two or more components of the signal; and providing, by the first module, only the first component of the signal.

In this method, providing only the first component of the signal may comprise processing, by the first module, the two or more components of the signal and passing, by the first module to the second module, only the first component of the signal. As discussed above, providing only the first component of the signal may comprise writing to a memory, by the first module, only the first component of the signal. It may also or alternatively comprise encoding, by the first module, only the first component of the signal. The first layer may be at a lower level in the hierarchy than the second layer. For example, the first layer may be at a lower resolution than the second layer.

A corresponding method of decoding a signal using a hierarchical coding approach may also be provided. This may be based on the arrangement of FIG. 2. The signal is encoded at a first layer using a first encoding module and at a second layer using a second encoding module. The signal is composed of two or more components. The method comprising receiving, at a decoding module, a first processed signal, said first processed signal being processed by the first encoding module. In this case, the first processed signal only contains a first component of the signal, and wherein the first processed signal was generated by providing only the first component of the signal based on a signal sent from the second encoding module to the first encoding module instructing the first encoding module to provide only said first component. The method may further comprise decoding, by the decoding module, a second encoded signal to produce a decoded signal, said second encoded signal being encoded by the second encoding module. The method may further comprise combining, by the decoding module, the second decoded signal to the first processed signal. The first encoded signal corresponding to the signal encoded at the first layer and the second encoded signal corresponding to the signal encoded at the second layer. Hence, this method may provide functionality similar to that shown in FIG. 2.

A method of encoding a signal may also be performed by the first encoding module in a set of encoding modules. In this case, the first encoding module may receive a signal from a second encoding module, e.g. as shown in FIG. 1, and the signal may instruct the first encoding module to only provide the first component (or a subset of components). From the viewpoint of the first encoding module, the method may comprise receiving, at the first encoding module, the two or more components of the signal and providing, by the first encoding module, only the first component of the signal. For example, the first encoding module may be controlled so as to only write one encoded and/or decoded component to memory.

In another example, there is provided a method of encoding a signal using a hierarchical coding approach, wherein the signal is encoded at a first layer using a first encoding module and at a second layer using a second encoding module, and wherein the signal is composed of two or more components, the method comprising sending a signal from the first encoding module to the second encoding module to instruct the second encoding module to only encode a first component of the signal at the second layer. In this case, the signal may be sent from the first encoding module to the second encoding module. For example, the signal may be sent when the first encoding module determines that only the first component of the signal is to be encoded at the second layer. The determination may comprise determining a condition requiring that only the first component of the signal should be provided. The condition may comprise encoding a signal for a low-power service. The low-power service may comprise a videoconferencing service. The condition may comprise a requirement to reduce power consumption. The condition may comprise a requirement to reduce the number of processing operations to be performed in the encoding of the signal. The processing operations comprise reading and/or writing to memory. For example, these may be mem-copy operations. The first encoding module may implement a first encoding method, and the second encoding module may implement a second encoding method. The first encoding method may be different from the second encoding method. The first encoding method may be the same as the second encoding method.

According to one specific implementation, a signal processor (e.g., computer processor hardware) is configured to receive a signal composed of multiple planes and encode it ("encoder"). For example, the planes may correspond to colour planes in a video or image signal, for instance a luma plane (Y) and two chroma planes (U and V). The encoder produces for each plane (for instance, the colour planes) of the signal a rendition of the signal at a first level of quality (e.g., a lower level) and encodes it with a first coding method. It then produces a predicted rendition of the signal at a second level of quality (e.g., a higher level), and correspondingly produces and encodes a layer (e.g., an echelon) of residual data at the second level of quality to apply to the predicted rendition of the signal at the second level of quality in order to produce a corrected rendition of the signal at the second level of quality. The predicted rendition of the signal may be generated by a scaling process, for example an upscaling, applied to said rendition of the signal at the first level of quality. Upon detecting that chroma processing should be limited to the lower level of quality, the encoder may generate and encode an echelon of residual data at the second level of quality for the luma component of the signal only, without generating also layers (e.g. echelons) of residual data at the second level of quality for the for chroma components of the signal. The residual data may be encoded with a second coding method. In one embodiment, the first and second encoding methods are the same encoding methods. In a different embodiment, the first and second encoding methods are different. A similar approach may be applied for multi-channel audio data, where residual data may only be provided for certain audio channels at a higher level of quality (e.g. a higher sampling or bit rate or a wider frequency range). In this case, audio output devices that normally output human speech, such as central and front speakers, may have corresponding audio channels (i.e. components) that are encoded by the second encoding module and audio output devices such as surround and sub-woofer speakers may receive components that are only encoded by the first encoding module (e.g., that are reconstructed by the second processing module without encoded elements from enhancement streams). This may save resources yet have a minimal effect on sound perception.

In a corresponding specific decoder implementation, a signal processor configured as a decoder receives an encoded signal, obtains a rendition of the signal at a first (lower) level of quality and produces a predicted rendition of the signal at a second (higher) level of quality, the second level of quality having a higher resolution (i.e., signal sampling rate) than the first level of quality. The predicted rendition of the signal may be generated by a scaling process, for example an upscaling, applied to said rendition of the signal at the first level of quality. The decoder may then receive and decode one or more echelons of residual data to apply to the predicted rendition of the signal to produce a corrected rendition of the signal at the second level of quality. When detecting that no echelons of residual data were encoded for one or more chroma planes of the signal, the decoder outputs for said chroma planes the predicted rendition of the planes at the second level of quality. In some examples, a bit in the decoded bitstream signals to the decoder the presence or absence of residual data at a given level of quality for a chroma plane.

In certain examples, the encoder is configured not to process and encode layers (e.g., echelons) of residual data for chroma planes at the second level of quality in case of specific applications, such as by means of non-limiting example videoconferencing. In other non-limiting embodiments, the encoder is configured not to process and encode echelons of residual data for chroma planes at the second level of quality in case of remaining battery falling below a threshold.

According to certain examples described herein, a signal processor is configured to receive a signal and encode it with a hybrid tier-based encoding method, such as by way of non-limiting example MPEG-5 Part 2 LCEVC (Low Complexity Enhancement Video Coding) or SMPTE VC-6 ST2117. The encoder receives the signal, downsamples it to a lower level of quality, produces for each colour plane of the signal a rendition of the signal at a first (lower) level of quality and encodes it with a codec implementing a first coding method. In some examples, the codec implementing the first coding method is a hardware codec. The encoder then receives from the hardware codec the decoded reconstruction of said first coding process, produces a predicted rendition of the signal at a second (higher) level of quality, and correspondingly produces and encodes an echelon of residual data at the second level of quality to apply to the predicted rendition of the signal at the second level of quality in order to produce a corrected rendition of the signal at the second level of quality. When detecting that chroma processing should be limited to a lower level of quality, the encoder signals to the codec implementing the first coding method that chroma residual data at a higher level of quality will not be produced. As a consequence, the codec implementing the first coding method will not provide to the encoder the decoded reconstructions of chroma planes at the first level of quality.

In certain examples, when receiving a signal from the encoder indicating that chroma residual data will not be produced, the codec implementing the first coding method will not perform mem-copy (memory copy) operations to provide the encoder with decoded reconstructions of chroma planes at the first level of quality, with consequent savings in processing power and battery power consumption. Correspondingly, the encoder will not perform memory operations and computing operations on chroma planes, producing further savings in processing power consumption. In a further embodiment, there is provided an instantiation of the encoding pipeline in order to allow on the fly disablement of the encoding of the chroma planes as described in the present description.

In certain examples, responsive to detecting that a specific use case requires a higher quality reconstruction, the encoder is configured to process residual data for all chroma planes, and signal to the codec implementing the first coding method that all chroma reconstructions at the first level of quality will be necessary.

Figure 4:
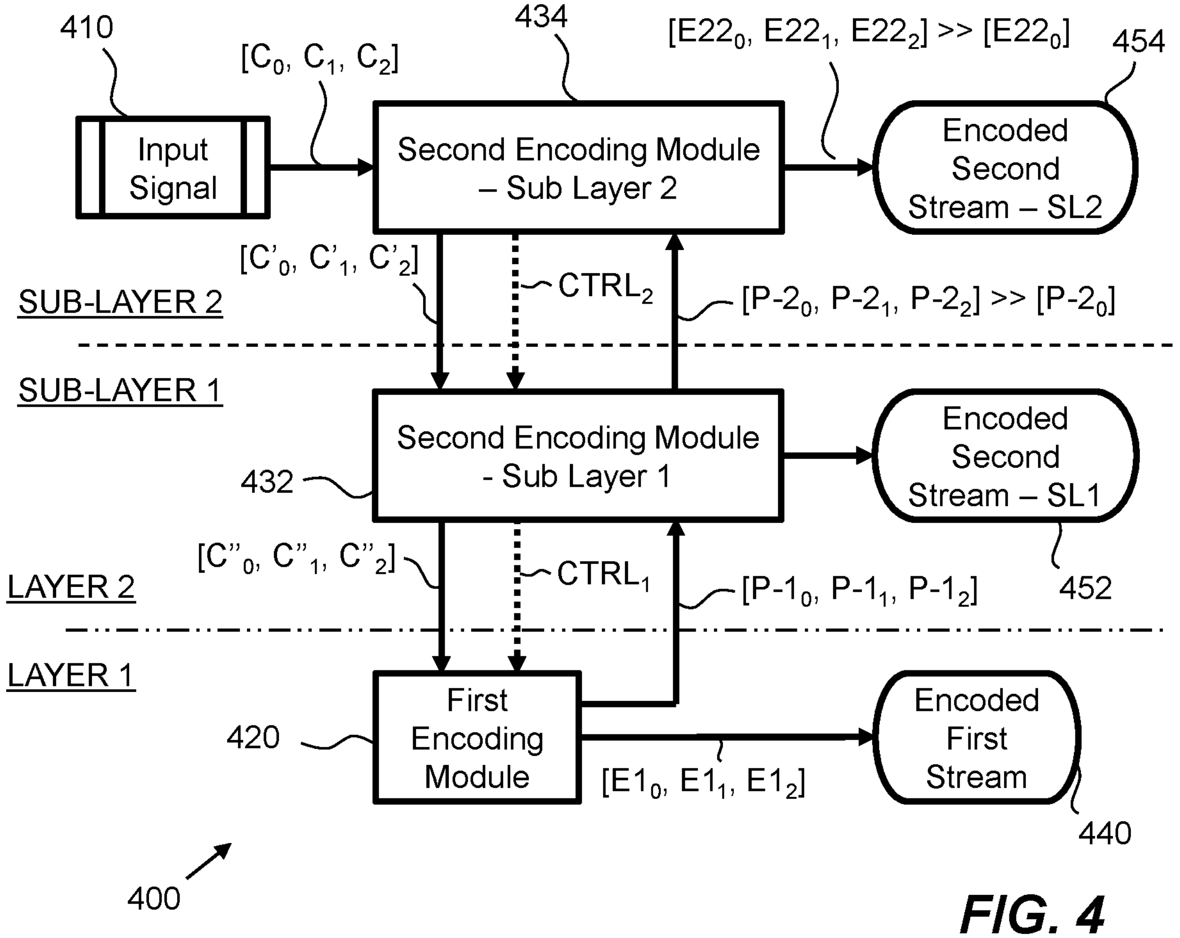
FIG. 4 shows a block diagram of another example of an encoding system in accordance with variations.

FIG. 4 shows a variation 400 of the encoding device 100 of FIG. 1 that is specific to an LCEVC-type implementation. In this case, as per LCEVC, the second layer is split into at least two sub-layers. These are shown as SUB-LAYER 1 and SUB-LAYER 2 in FIG. 4. Those familiar with the LCEVC specification will recognise that these may be implemented by enhancement sub-layers at possibly different spatial resolutions in one or more directions depending on encoding configuration (e.g., sub-layer 1 may be at the same, or a higher, resolution as the first layer and sub-layer 2 may be at a resolution that is higher than sub-layer 1). In FIG. 4, there is a first encoding module 420, which may comprise a base codec for use with an LCEVC encoder, and two sub-layer encoding modules that comprise an enhancement (LAYER 2) encoder—a sub-layer 1 encoding module 432 and a sub-layer 2 encoding module 434. Each sub-layer encoding module 432 and 434 generates a corresponding encoded sub-layer stream 452 and 454, in a manner similar to that shown in FIG. 1. The encoded second stream comprising encoded sub-layers 452 and 454 may comprise an LCEVC encoded enhancement stream and the first encoded stream 440 may comprise an encoded base stream.

In the example of FIG. 4, one or more of the first encoding module 420, the sub-layer 1 encoding module 432 and the sub-layer 2 encoding module 434 may be instructed to encode a subset of signal components as described herein. In FIG. 4, there is a cascade of control signals, the sub-layer 1 encoding module 432 sends a first control signal $CTRL_1$ to the first encoding module 420 and the sub-layer 2 encoding module 434 sends a second control signal $CTRL_2$ to the sub-layer 1 encoding module 432. Other control configurations (e.g. control signals in series from an additional control component) may also be used. Hence, one or more of the first encoding module 420, the sub-layer 1 encoding module 432 and the sub-layer 2 encoding module 434 may be controlled to only encode a subset of components and this may be followed by modules at higher levels of the hierarchy. FIG. 4 shows the sub-layer 1 encoding module 432 being signalled by the sub-layer 2 encoding module 434 to encode only one component (e.g., only a first component such as a luma signal), such that the sub-layer 2 encoding module 434 only receives a predicted reconstruction for the selected one component rather than the full set of components. In these examples, the two sub-layer encoding modules may be controlled as described with reference to the first and second encoding modules of FIG. 1. Hence, encoded residual data for a subset of components may be present in one, or both of, the encoded second streams 452 and 454.

In preferred examples, a particular subset of components may be selected for encoding when resources are constrained. For example, with colour components it has been found that encoding residual data for only lightness or contrast planes, and not encoding chroma planes, produces improved perception of video quality over no encoded residual data at that level of quality but uses considerable fewer resources (e.g., 33% of the encoding resources). While quality is best when all components are encoded, this may not be possible when resources are limited, e.g. when applications take processing resources during a video call or when a mobile phone runs low on battery; in these cases reducing the encoded components can help slow resource drain yet provide adequate quality to continue the call. Also the systems and methods discussed herein may be flexibly and dynamically applied during encoding without needing to stop or start the video stream, meaning that falling back to a reduced number of components is graceful and can provide a position that provides improved visual experience to falling back to a lower level of quality immediately.

The techniques described herein may be implemented in software or hardware, or may be implemented using a combination of software and hardware. They may include configuring an apparatus to carry out and/or support any or all of techniques described herein.

The above embodiments are to be understood as illustrative examples. Further embodiments are envisaged. It to be understood that any feature described in relation to any one embodiment may be used alone, or in combination with other features described, and may also be used in combination with one or more features of any other of the embodiments, or any combination of any other of the embodiments.

Furthermore, equivalents and modifications not described above may also be employed without departing from the scope of the invention, which is defined in the accompanying claims.

The invention claimed is:

1. A method of encoding a data signal using a hierarchical coding approach, wherein the data signal is encoded at a first layer using a first encoding module and at a second layer using a second encoding module, the first layer being lower than the second layer, and wherein the data signal is composed of two or more components, the method comprising:

sending a control signal from the second encoding module to the first encoding module, wherein the control signal is generated by the second encoding module, and wherein the control signal instructs the first encoding module to operate in an operating output mode in which the first encoding module provides to the second encoding module only a first component of the data signal at the first layer, the control signal defining which component is to be output by the first encoding module, wherein:

the operating output mode comprises writing, by the first encoding module, the first component of the data signal to a shared memory or interface accessible to the second encoding module, and the first encoding module, in the operating output mode, processes the data signal to identify the first component and outputs the identified first component for use by the second encoding module.

2. The method of claim 1, wherein the control signal is sent when the second encoding module determines that only the first component of the data signal is to be encoded at the second layer.

3. The method of claim 2, wherein the determination comprises determining a condition requiring that only the first component of the data signal should be provided.

4. The method of claim 3, wherein the condition comprises encoding the data signal for a low-power service.

5. The method of claim 4, wherein the low-power service comprises videoconferencing.

6. The method of claim 3, wherein the condition comprises a requirement to reduce power consumption.

7. The method of claim 3, wherein the condition comprises a requirement to reduce a number of processing operations to be performed in the encoding of the data signal.

8. The method of claim 3, wherein the processing operations comprise reading and/or writing to memory.

9. The method of claim 1, wherein the first encoding module implements a first encoding method, and the second encoding module implements a second encoding method.

10. The method of claim 9, wherein the first encoding method is different from the second encoding method.

11. The method of claim 9, wherein the first encoding method is the same as the second encoding method.

12. The method of claim 1, wherein the first layer is at a lower resolution than the second layer.

13. The method of claim 1, further comprising:

receiving, at the first module, the two or more components of the data signal; and providing, by the first encoding module, only the first component of the data signal to the second encoding module.

14. The method of claim 1, wherein providing only the first component of the data signal comprises:

processing, by the first encoding module, the two or more components of the data signal; and passing, by the first encoding module to the second encoding module, only the first component of the data signal.

15. The method of claim 1, wherein providing only the first component of the data signal comprises:

writing to a memory, by the first module, only the first component of the data signal.

16. The method of claim 1, wherein providing only the first component of the data signal comprises:

encoding, by the first encoding module, only the first component of the data signal.

17. The method according to claim 1, wherein the data signal is a video signal, the components comprise luma and chroma components, and the first component comprises the luma component.

18. A method of decoding a data signal using a hierarchical coding approach, wherein the data signal is encoded at a first layer using a first encoding module and at a second layer using a second encoding module, the first layer being lower than the second layer, and wherein the data signal is composed of two or more components, the method comprising:

receiving, at a decoding module, a first processed signal, said first processed signal being processed by the first encoding module, and wherein the first processed signal contains only a first component of the data signal, and wherein the first processed signal was generated by providing only the first component of the data signal based on a control signal sent from the second encoding module to the first encoding module instructing the first encoding module to provide only said first component, wherein:

the control signal is generated by the second encoding module, the control signal instructs the first encoding module to operate in an operating output mode in which the first encoding module provides the first component to the second encoding module, the control signal defines which component is to be output by the first encoding module, the operating output mode comprises writing, by the first encoding module, the first component of the data signal to a shared memory or interface accessible to the second encoding module, and the first encoding module, in the operating output mode, processes the data signal to identify the first component and outputs the identified first component for use by the second encoding module.

19. An encoding device configured to encode a data signal using a hierarchical coding approach, wherein the data signal is encoded at least a first layer using a first encoding module and at a second layer using a second encoding module, the first layer being lower than the second layer, and wherein the data signal is composed of two or more components, the encoding device comprising:

the first encoding module; and the second encoding module, wherein:

the encoding device is configured to send a control signal from the second module to the first module to instruct the first module to provide to the second module only a first component of the data signal at the first layer, the control signal is generated by the second encoding module, the control signal instructs the first encoding module to operate in an operating output mode in which the first encoding module provides the first component to the second encoding module, the control signal defines which component is to be output by the first encoding module, the operating output mode comprises writing, by the first encoding module, the first component of the data signal to a shared memory or interface accessible to the second encoding module, and the first encoding module, in the operating output mode, processes the data signal to identify the first component and outputs the identified first component for use by the second encoding module.

* * * * *